United States Patent [19]

Olson

[11] Patent Number: 4,747,370
[45] Date of Patent: May 31, 1988

[54] BIRD FEEDER SYSTEM

[76] Inventor: Mark E. Olson, Rte. 1, Box 90, Wahkon, Minn. 56386

[21] Appl. No.: 861,360

[22] Filed: May 9, 1986

[51] Int. Cl.⁴ .............................................. A01K 39/01
[52] U.S. Cl. ................................. 119/52 R; 119/51 R
[58] Field of Search ............... 119/52 R, 51 R, 52 AF

[56] References Cited

U.S. PATENT DOCUMENTS

| | | | |
|---|---|---|---|
| 1,790,045 | 1/1931 | Harvey | 119/52 R |
| 3,089,462 | 5/1963 | Brockmann | 119/52 R |
| 3,136,296 | 6/1964 | Luin | 119/52 R |
| 3,179,244 | 4/1965 | Kuhn | 119/52 R X |
| 3,354,868 | 11/1967 | Woodling | 119/52 R |
| 3,441,002 | 4/1969 | Lawalin et al. | 119/52 R |
| 4,201,155 | 5/1980 | Hyde, Jr. | 119/52 R |
| 4,204,500 | 5/1980 | Podjan | 119/52 R |
| 4,215,652 | 8/1980 | Kerscher | 119/52 R X |
| 4,246,869 | 1/1981 | Tobin, Jr. | 119/51 R |
| 4,381,364 | 7/1983 | Georgalopoulos et al. | 525/125 X |

Primary Examiner—Carl D. Friedman
Assistant Examiner—Creighton Smith
Attorney, Agent, or Firm—Hugh D. Jaeger

[57] ABSTRACT

Bird feeder system including a bird feeder bag of bird feed and at least one downward telescoping section extending from a base of the bag. In one embodiment, two telescoping sections are provided which telescope from the base of the bird feeder bag. Feed such as seeds fall down through the telescoping sections, and into feeding trays through geometrically configured elongated openings on lower opposing longitudinal sides of each telescoping section. A lip of finite height surrounding each of the feed trays provides for the gravity feed attaining a predetermined height within the tray.

7 Claims, 5 Drawing Sheets

BIRD FEEDER SYSTEM

BACKGROUND OF THE INVENTION

1. Field of the Invention

The present invention pertains to bird feeders, and more particularly, a bird feeding system with at least one telescoping section, extending downwardly from a base of a bag of bird feed.

2. Description of Prior Art

Bird feeders per se have been known in the prior art, and have included such structures as those which adhere to a window with plastic suction cups, those which tie onto trees, and those of plastic webbing containing feed such as suet, and other gravity free fall devices of feed.

U.S. Pat. No. 4,381,364 discloses a bird feeder with two sections which do not telescope and which depend on gravity fall of the food.

U.S. Pat. No. 3,089,462 provides for a prepackaged box bird feeder.

U.S. Pat. No. 3,354,868 provides for a packaged container and bird feeder.

U.S. Pat. No. 2,891,711 provides for a packaged bird feeder.

U.S. Pat. No. 3,179,244 provides for a packaged bird feeder.

Likewise, U.S. Pat. Nos. 4,201,155, 3,441,002, and 4,233,941 also provide for related bird feeder structures.

None of the prior art references disclose a telescoping prepackaged bird feeding system as now disclosed.

The present invention provides a bird feeding system with telescoping sections, each telescoping section including an area to support bird feed such as seeds including a lip about a feed area for supporting and feeding a bird. The package bird feeding system is intended to support an amount of feed such as ten, twenty, or fifty pounds, and is provided for easy transportation, as well as easy opening and operating by an individual.

SUMMARY OF THE INVENTION

The general purpose of the present invention is to provide a prepackaged bird feeder with telescoping sections for containing bird feed with gravity causing the trays to fill.

According to one embodiment of the present invention, there is provided a prepackaged bird feeder bag, at least one section which telescopes into and out of the bottom of a base of the bag, and includes a plurality of elongated geometrical openings, preferably opposing, and the openings substantially about the lip level of a tray on the bottom of the telescoping section providing for gravity feed flow of food through the openings onto the tray and to a level of a lip about a feeding area of the tray. Preferably, at least two telescoping sections can be provided accordingly. The bag can include a handle for supporting and carrying the bird feed system.

One significant aspect and feature of the present invention is a self-contained prepackaged bird feeding system, which when carried home from the store, provides for secure transportation of bird feed within the bird feeding system. After use, the bird feeding system is disposable and can be thrown out accordingly. A more innovative person could possibly refill the bird feeding system by slitting a portion of the package, pouring in feed, and subsequently taping that portion of the package back together. Stapling could be used in lieu of taping.

Another significant aspect and feature of the present invention is a multi-tier bird feeding system which telescopes providing for compact storage and transportation, and subsequent use for accommodating small, as well as large size birds.

Having thus described embodiments of the present invention, it is a principle object here to provide a bird feeding system.

One object of the present invention is to provide a small compact bird feeding system for transportation and storage.

Another object of the present invention is to provide multi-tier bird feeding trays which telescope from a storage bag of bird food.

DESCRIPTION OF THE PREFERRED EMBODIMENTS

Figure 1:
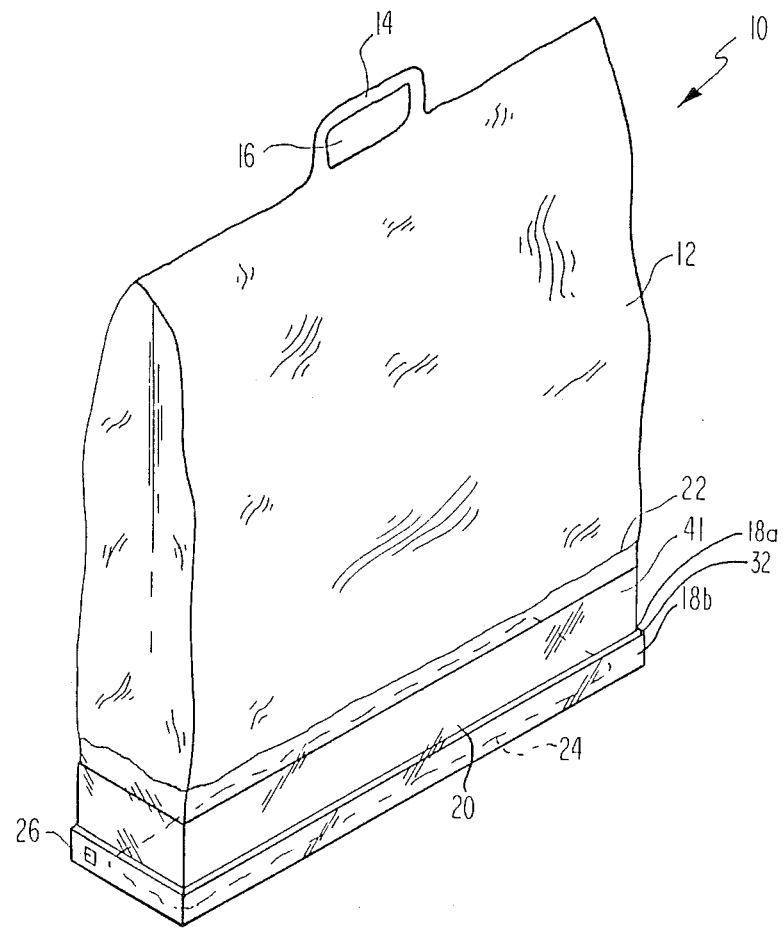
FIG. 1 illustrates the perspective view of a bird feeding system prior to operation.

FIG. 1 illustrates a bird feeding system 10, including a storage bag 12, a handle 14 with a hole 16 and two telescoping sections 18a and 18b. Shrink wrap plastic 20 or the like extends circumferentially from points 22 to 24, and includes a pull tab 26 from one of the telescoping section to allow for release and downward telescoping of the sections 18a and 18b by gravity free fall. This then provides for free fall of feed from the sections 18a and 18b after the shrink wrap is removed from the circumference of the bird feeding system. Of course, a minor hand pull may be required to assist in the gravity fall of the telescoping sections. The bag can be made out of any suitable polymers, Tyvek, waterproof paper, or the like. The handle can be any suitable plastic handle being capable of being secured, such as by securing plastic welding or the like to the bag 12. The telescoping section can be made out of a polymer weather proofed cardboard, plastic, or the like as later described.

Figure 2:
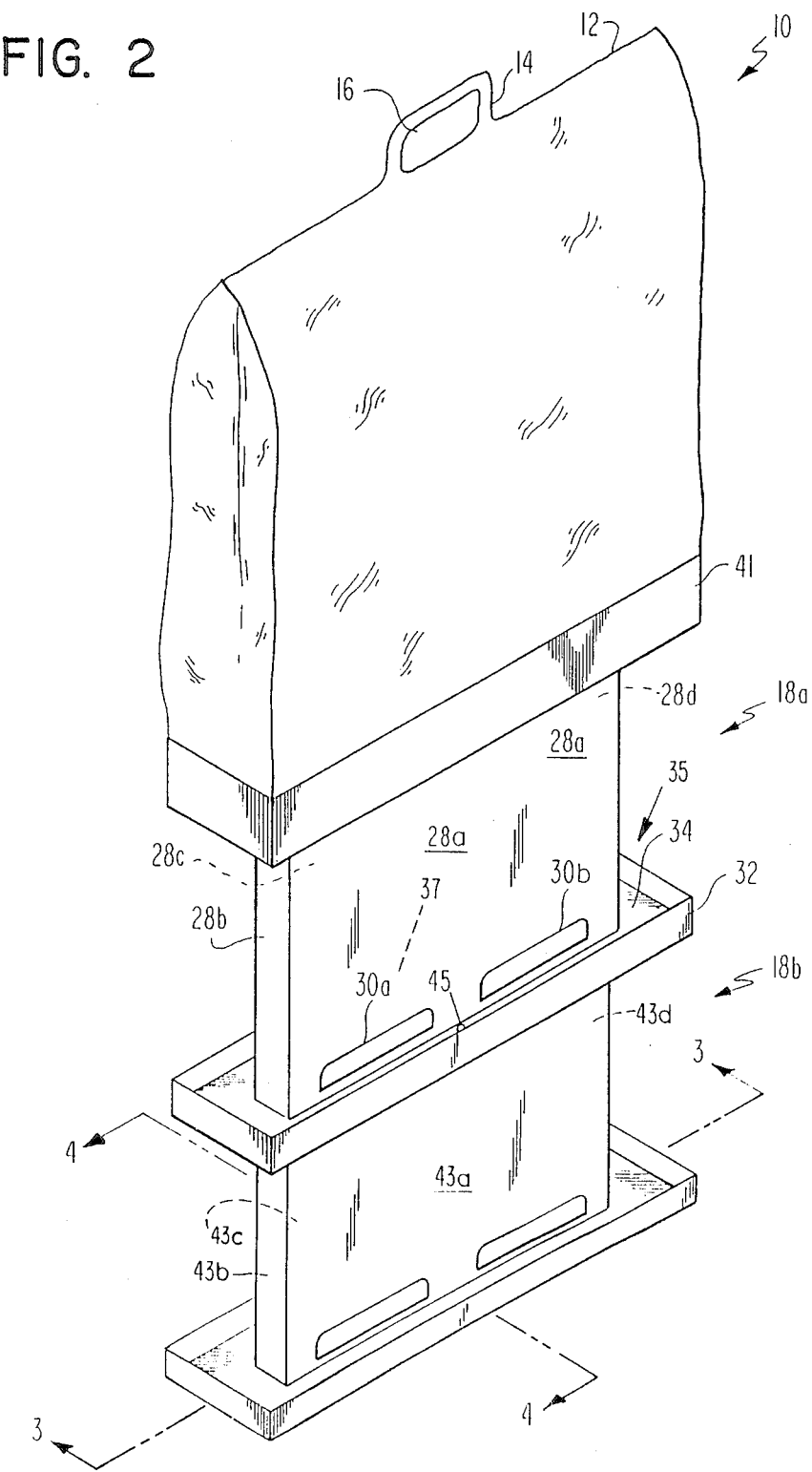
FIG. 2 illustrates a perspective view of the bird feeding system with two sections telescoping downwardly.

FIG. 2 illustrates a perspective view of the bird feeding system 10 where the telescoping sections 18a and 18b engage in a downward position under the force of gravity for subsequent gravitational dispensing of feed. For purposes of illustration and sake of brevity and clarity in the drawing, feed has not been illustrated in the cross section extending up to the lip of the telescoping tray as later described. All numerals correspond to those elements previously described.

By way of example and for purposes of illustration only, a single telescoping section 18a will be described in particular detail as all telescoping sections are identical in structure and operation except for being slightly smaller to provide for the telescoping nature and retaining operation as later described in FIG. 3.

Telescoping section 18a includes a four-sided continuous member 28a–28d. A plurality of geometric openings which may be any predetermined geometrical configuration such as elongated openings as illustrated extend about the lower bottom portion having a top height not greater than the height of a lip 32 which surrounds a base 34. Base 34 is joined to the four sided member 28 such as by plastic welding, glue, or the like. The base 34 and lip 32 define a feed tray 35.

The holes can be triangular or elongated longitudinal horizontal types of holes as illustrated. The base 34 includes drainage holes 45 and 37 and a rectangular hole 33 as illustrated in FIG. 3, for capturing a ramped lip 44a–44d of the internal telescoping section 18b. On the upper top portion of the telescoping section 18a, opposing stop members 36a–36b, such as a ramped shaped structure in cross-section as illustrated or a rectangular shaped member in cross section, are provided for engagement along, within and about a opening 38 in the bottom base section 41 of the bag 40. The opening 38 provides for close sliding engagement with the sides 28a–28d of the telescoping section 18a. This is best illustrated in FIG. 3 and FIG. 4. The stop members 36a–36d secure the first telescoping section 18a within the base 41 and prevents it from further downward travel.

The bag 40 can secure to the outer or inner side of the side of the bottom base member 41 such as by securing or the like. The base 41 and the bag 12 can be one continuous structure. In a like manner lower horizontal ramped stop members 44a–44d position along the upper edges of the 4 sided continuous member 43a–43b for containing member 43a–43b, of the telescoping section 18b within the opening 33 of the feed tray 35 when the telescoping section 18b is moved to its lower most position. In a like manner, lower horizontal stop members 42a and 42b position along and slide within the edges of the opening 33 for containing the upper portion of the telescoping section 18b as also shown in FIG. 3 and FIG. 4. Telescoping section 18b is a structure identical to that telescoping section 18a, but of course contains no bottom rectangular hole in the base of 18b and of course is slightly smaller. Additional telescoping sections could be provided, as so desired, by using decreasing cross sectional telescoping members.

Figure 3:
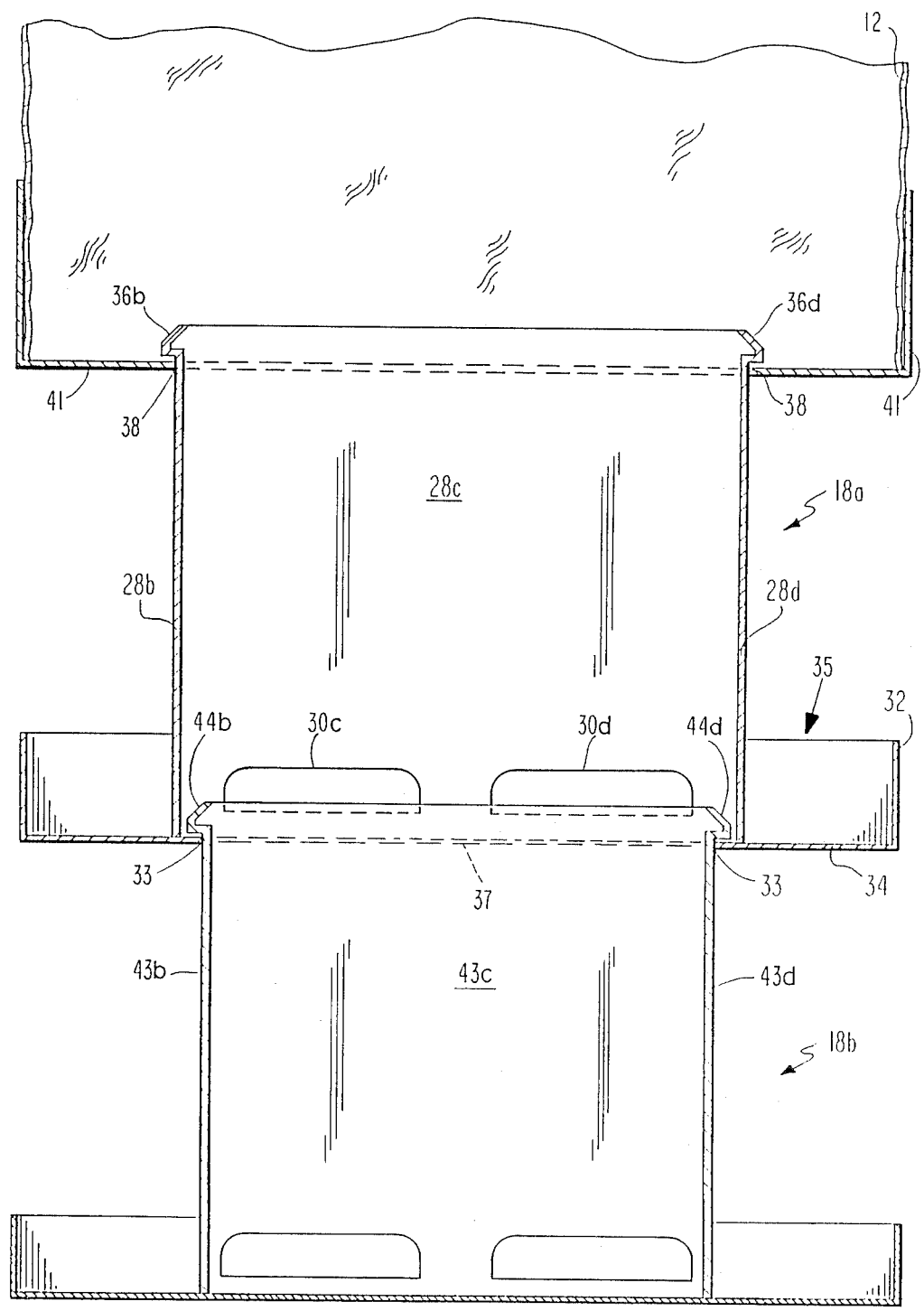
FIG. 3 illustrates a cross-sectional front view taken along line 3—3 of FIG. 2.
Figure 4:
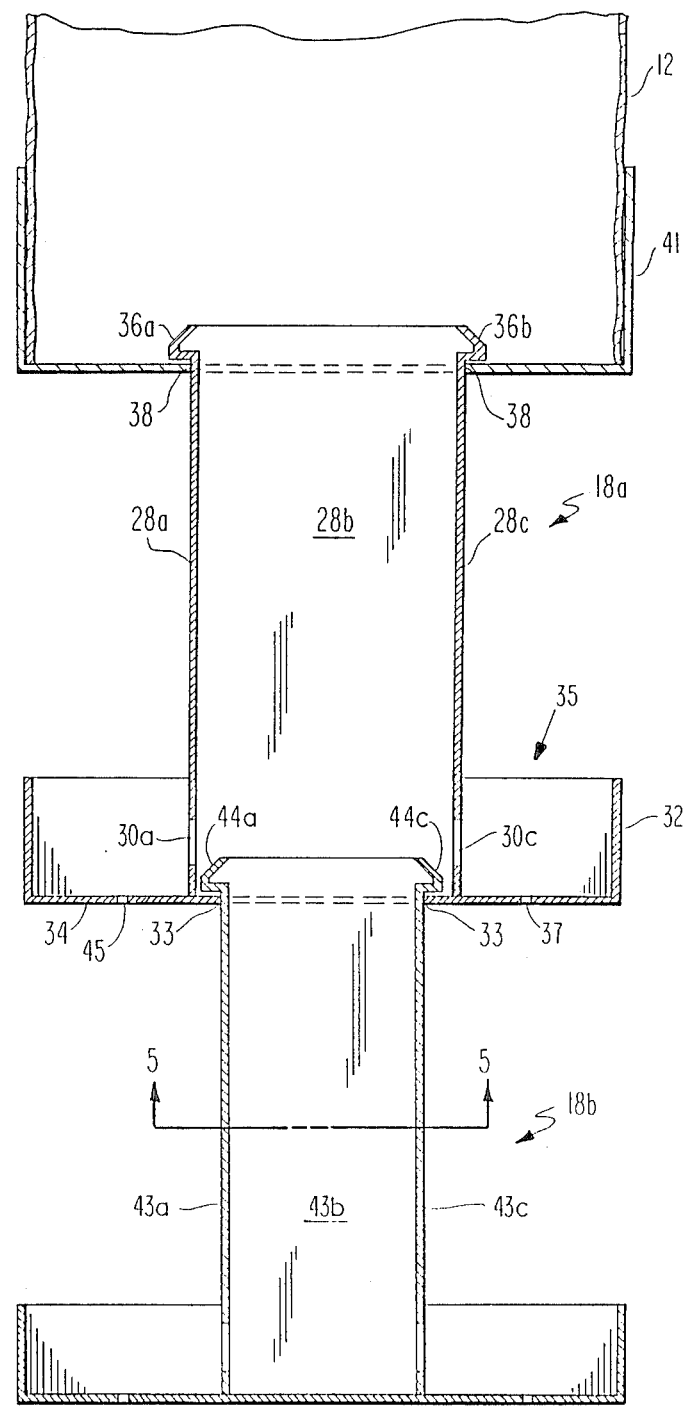
FIG. 4 illustrates a cross-sectional end view taken along line 4—4 of FIG. 2; and, FIG. 5 illustrates a cross-sectional bottom view taken along line 5—5 of FIG. 4.

FIG. 3 illustrates a cross-sectional view taken along line 3—3 of FIG. 2 where all numerals correspond to those elements previously described. The particular height of the geometric openings 30a–30d can be sized accordingly dependant upon the type of feed, the size of the overall structure, and the type of birds to be accommodated by the structure. In the preferred embodiment, the height of the openings may only be that up to about the height of the lip of feeding tray. It may be foreseen that a higher height will be required such as for sunflower seeds or the like, to provide gravity force flow of the feed into the feeding tray 35; and therefore, the top height of the geometrical holes would be slightly above that of the lip. The consideration that the height of the feed openings can be less than, equal, or greater than the height of the lip is so determined by the type of bird feed, and whether the bird seed is the size of milo or the like, or is a larger specialty seed such as sunflower seeds in addition to overall size of the bird feed system, the telescoping sections, the tray size, and size of the birds to be fed.

FIG. 4 illustrates an end cross-sectional view taken along line 4—4 of FIG. 2 where all numerals correspond to those elements previously described.

Figure 5:
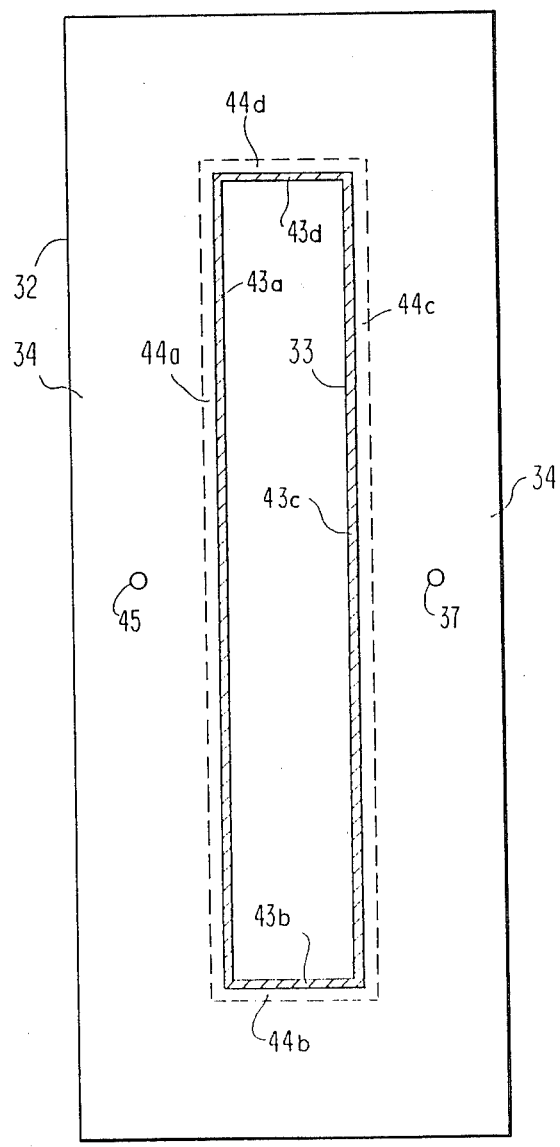

FIG. 5 illustrates a cross-sectional bottom view taken along line 5—5 of FIG. 4 where all numerals correspond to those elements previously described.

MODE OF OPERATION

The bird feeding system, as brought home from the store, can hang in an appropriate and suitable spot in a yard such as with a string tied around the handle to a tree limb. The zip tag 26 is pulled removing the shrink wrap 20 and providing for release of the telescoping sections and release of the feed based on gravity free fall of the feed through the bag, the telescoping sections, the elongated openings about the feed trays, and into the feed tray. The feed flows downwardly through the geometrical openings into the tray and across the tray. A slight amount of hand pulling might be required based on frictional engagement between the components and possible minor shaking may be required to first assist in initial free fall by gravity of the feed. Birds will then sit on the lips or rest on the food within the trays, and feed from the trays.

It is possible that an individual may want to refill the tray and a suitable refilling spot would be accessed at a top edge of the bag which can be subsequently stapled or taped shut to preserve the integrity of the food from the elements of weather.

Various modifications can be made to the present invention without departing from the scope thereof.

I claim:
1. Bird feeding system including:
   a. storage means for food; and,
   b. at least a plurality of telescoping geometrical section means extending downwardly therefore, each of said telescoping sections including a feed tray, a lip about the feed tray, and a plurality of feed openings in said geometrical section means positioned adjacent to the feed tray for gravity free fall of feed from the storage means to the tray, and means for slidably retaining said telescoping section within said storage means.
2. System of claim 1 comprising two telescoping sections.
3. System of claim 1 wherein each telescoping section is made of a polymer.
4. System of claim 1 wherein each of said feed openings are elongated.
5. System of claim 1 wherein said retaining means comprises a ramped member on the upper portion of said telescoping section.
6. The system of claim 1 wherein the means in (a) is a flexible bag.
7. A bird feeding system with a handle, a hole in a handle, the handle attached to the top of a bag, a base attached to the bag, a covering over the bottom of the bag and feed trays, a hole in the base of the bag, two telescoping sections, the first section having a ramped stop member, sides, feed holes, a base tray with a bottom hole, side lips and drainage holes, the second telescoping section having a ramped stop member, sides, feed holes, a feed tray, side lips and drainage holes, the first telescoping section of which slides with the help of gravity within a hole in the base of the bag until its downward motion is stopped by the engagement of the ramped stop member against the base of the bag and the second telescoping section of which slides with the help of gravity within the hole within the base of the first telescoping section until its downward motion is stopped by the engagement of its ramped stop member against the base of the base tray until all telescoping sections are fully extended allowing for gravity feed of bird feed from the bag through the first telescoping section, out of the feed holes in the first telescoping section, onto the upper feed tray, from the first telescoping section into the second and subsequent telescoping sections and out of the feed holes and subsequent feed holes onto the lower and subsequent feet trays.

* * * * *